Patented May 27, 1924.

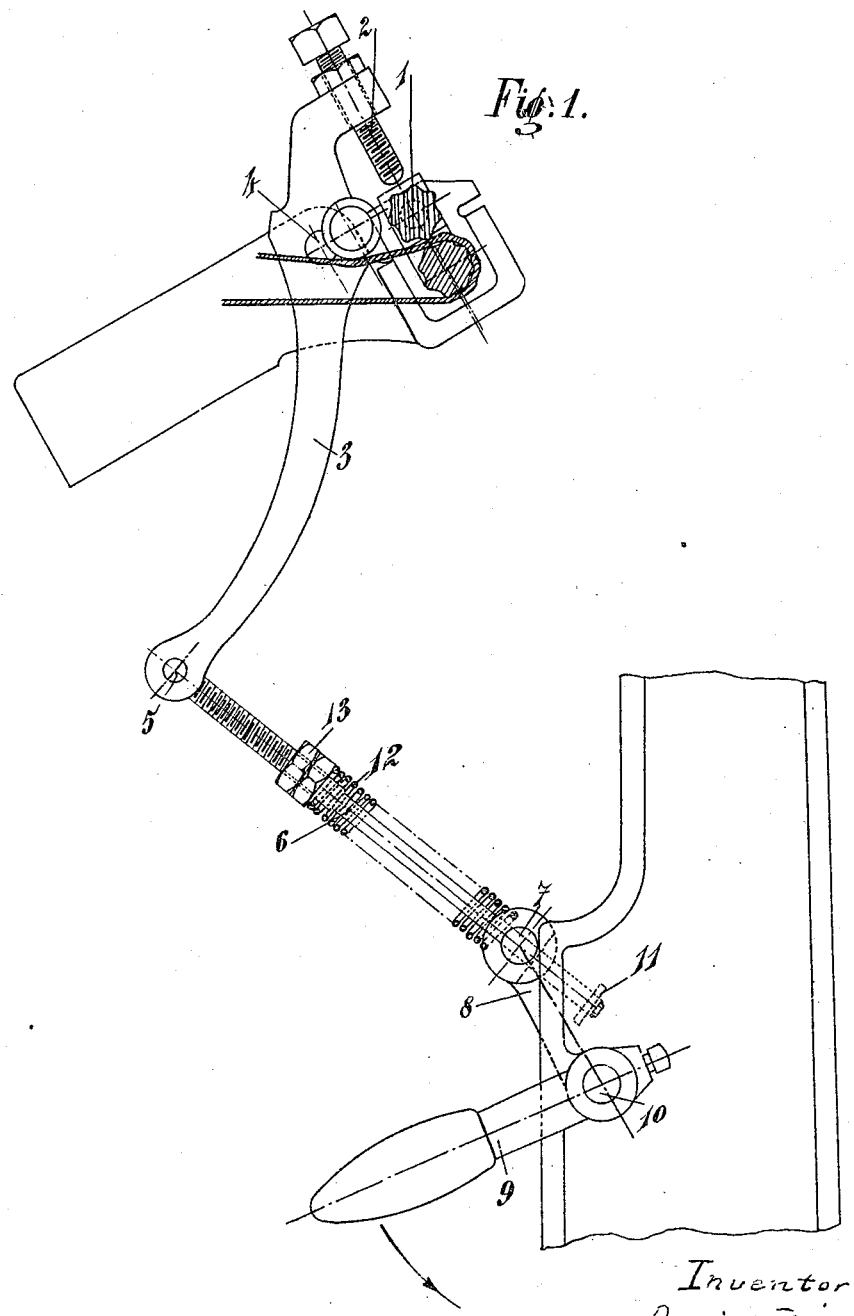

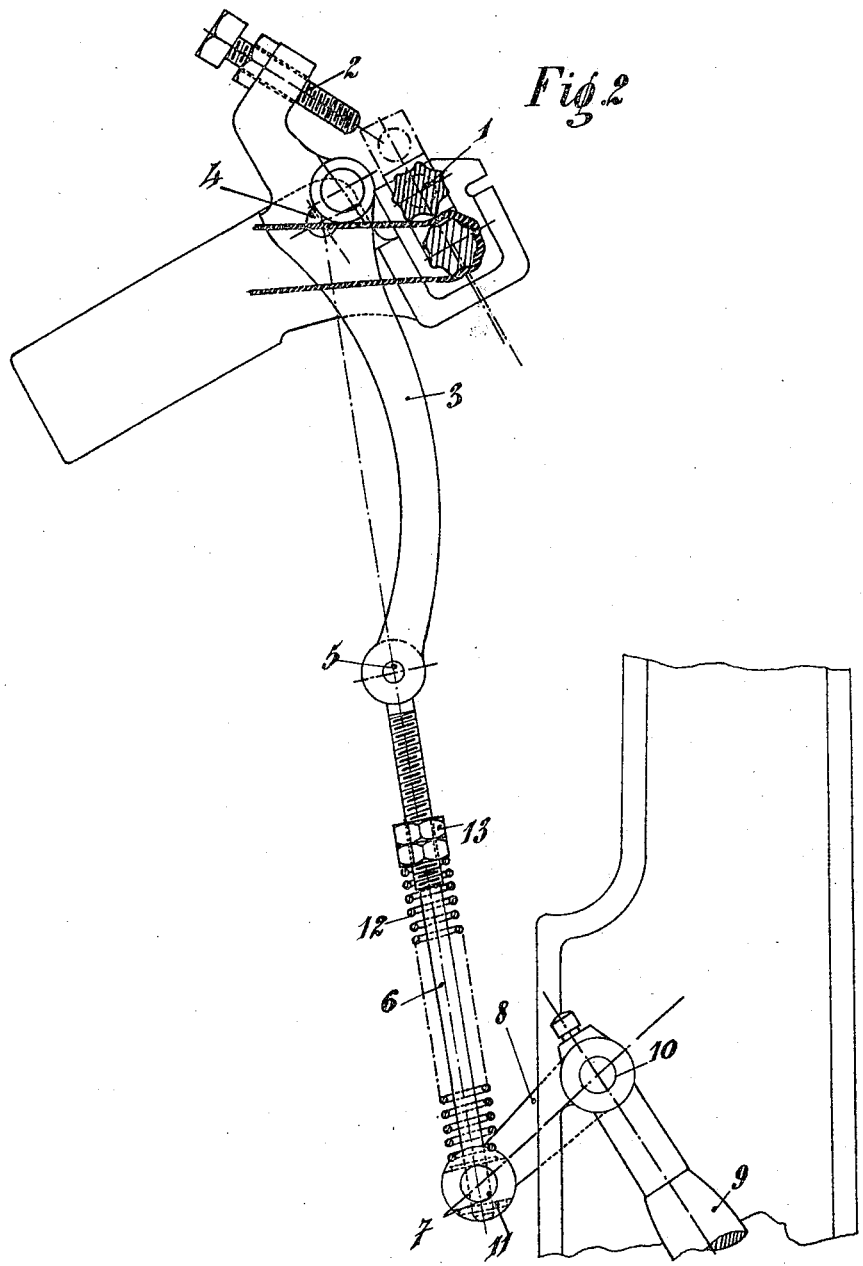

1,495,627

UNITED STATES PATENT OFFICE.

DANIEL ZIERER, OF GUEBWILLER, FRANCE, ASSIGNOR TO NOUVELLE SOCIETE DE CONSTRUCTION CI-DEVANT N. SCHLUMBERGER & CIE., OF GUEBWILLER, HAUT-RHINE, FRANCE.

ROLLER MOUNTING IN COMBING MACHINES.

Application filed May 12, 1923. Serial No. 638,445.

*To all whom it may concern:*

Be it known that I, DANIEL ZIERER, a citizen of the Republic of France, residing at Guebwiller, in the Department of Haut-Rhine, France, have invented certain new and useful Improvements in Roller Mountings in Combing Machines, of which the following is a full, clear, and exact description.

This invention relates to Heilmann combing machines and others working on the same principle, and it has for its object to provide improved apparatus for exerting pressure upon the detaching rollers in such a manner that, for the purpose of removing these rollers and replacing them into position, this pressure shall be capable of being taken off rapidly and without throwing the machine out of adjustment, and of being applied again quickly and exactly at the same point and with the same force.

Hitherto these results have been attained only slowly, because the pressure upon the detaching rollers was taken off by the unscrewing of the screws or screw-threaded rods bearing upon the bearings of the rollers until these bearings were sufficiently released to allow of removing the rollers, whilst the replacing of the said rollers necessitated the re-tightening of the screws until the desired pressure was obtained which, even after numerous trials and considerable loss of time was almost never strictly the same, nor applied to exactly the same point.

These drawbacks are obviated by the improvements forming the subject matter of the present invention. which are hereinafter described by way of an example of an embodiment of the invention in their application to a combing machine of the Heilmann type and illustrated in the accompanying drawings in which:—

Figure 1 is a side elevation of the improved apparatus in working position.

Figure 2 is a similar view showing the parts in the raised position.

As shown, 1 is the detaching roller upon the bearing of which the pressure screw 2 is adapted to bear. This screw is carried by the head of a lever 3 fulcrumed at 4 and connected pivotally at 5 to a connecting rod 6 the opposite end of which slides through a block 7 rotatably mounted on the end of the bent arm 8 of an operating lever 8—9 fulcrumed at 10 on the frame of the machine.

A washer 11 serves as a stop for the block 7, and is under the action of a spring 12 which is coiled around the connecting rod 6 and works under compression between the said block and a nut 13 for stopping and adjusting purposes mounted on the upper portion of the connecting rod which is screw-threaded for this purpose.

In the working position (Fig. 1), the pressure of the spring 12 bearing upon the block 7 of the operating lever 8—9 acts upon the nut 13 of the connecting rod 6. This pressure is transmitted through the medium of the lever 3 fulcrumed at 4, to re-appear as the pressure of the screw 2 upon the roller 1. The adjustment of this pressure is effected by adjusting the nut 13 along the connecting rod 6.

In order to take the pressure of the screw 2 off the roller 1, it is sufficient to move the hand-lever 9 in the direction of the arrow into the position shown in Figure 2. In this movement the spring 12 will at first be slightly compressed until the centres 10, 7 and 5 are situated in one and the same straight line. Then, on continuing the downward movement of the handle 9 the spring will be allowed to expand and cause the connecting rod 6 to slide through the block 7 until it is stopped by the washer 11. At this instant the connecting rod 6 and the lever 3 will be situated in one and the same longitudinal straight line, and the centres 11, 5, and 4 will be situated likewise in one and the same straight line, with the result that the head of the lever 3 and the screw 2 will be brought into a position of release for the bearings of the roller 1 which can then be removed and replaced.

Then on moving the handle 9 in the reverse direction the spring 12 will be compressed until the centres 10, 7 and 5 are in one and the same straight line after which the spring 12 can expand slightly, and at the end of the movement of the lever 8—9, it will exert upon the lever 3 the same pressure as before, thereby ensuring that the screw 2 bearing again upon the roller 1, shall exert exactly the same pressure as before.

Owing to these improvements it will be found that the manœuvres are effected instantly, and the pressure taken off the roller 1 will be reapplied to it with strictly the same force and at exactly the same point without trials or loss of time.

It is to be understood that the carrying into effect of these improvements may undergo changes and modifications in their details and also that mechanical equivalents may be used without departing from the nature of the invention.

What I claim is:

1. In a combing machine, a pair of rollers between which the material passes, movable bearings in which one of the rollers is journalled, and means to press the last mentioned roller against the other, including a lever, a screw mounted on the lever to press against one of the bearings, a thrust link pivoted to the lever, and means to actuate the link to press the screw against the corresponding bearing or to withdraw the screw from said bearing to permit removal of the corresponding roller.

2. In a combing machine, two rollers between which the material passes, and means to press one of said rollers against the other, comprising a lever, a connecting rod pivoted to the lever, an abutment fixed on said rod, a helical compression spring on said rod and engaging said abutment, a block slidable on said rod and engaging said spring at the end opposite said abutment, a stop on said rod to limit the movement of the block, and means for actuating said block to exert pressure on said rollers or to withdraw said lever to ineffective position.

3. In a combing machine, two rollers between which the material passes, and means to press one of said rollers against the other, comprising a lever, a connecting rod pivoted to the lever, an abutment fixed on said rod, a helical compression spring on said rod and engaging said abutment, a block slidable on said rod and engaging said spring at the end opposite said abutment, a stop on said rod to limit the movement of the block, a second lever pivoted to said block, and means to stop the second lever at one side of a straight line with the rod so that the second lever will be retained in this position by the pressure of the spring but when swung in the opposite direction will relieve the pressure of the rollers.

4. In a combing machine, a pair of rollers between which the material passes, movable bearings for one of the rollers, and means to press the last mentioned roller against the other, including a lever to act on one of said bearings, a yieldable actuating device for said lever, and means to throw said yieldable device out of operation to release the lever and permit the removal of the roller with the movable bearings.

5. In a combing machine, a pair of rollers between which the material passes, movable bearings for one of the rollers, and means to press the last mentioned roller against the other, including a lever, a pressure screw in said lever to act on one of said bearings, a resilient compressible link pivoted at one end to said lever, a device pivoted to the other end of the link and urged by the pressure of the link to either side of its most effective position, and means to limit its movement in one direction so that the expansive stress exerted by the link will maintain said device in substantially effective position.

In witness whereof, I hereunto subscribe my signature.

DANIEL ZIERER.